March 24, 1942.    S. A. JOHNSON    2,277,550
CIRCULAR SAW
Filed May 2, 1938    2 Sheets-Sheet 1

INVENTOR.
SYVER A. JOHNSON
BY Stanley J. MacDuff
ATTORNEY.

INVENTOR.
SYVER A. JOHNSON
BY
Stanley I. MacDuff
ATTORNEY.

Patented Mar. 24, 1942

2,277,550

UNITED STATES PATENT OFFICE 2,277,550

CIRCULAR SAW

Syver A. Johnson, South Bend, Ind.

Application May 2, 1938, Serial No. 205,662

2 Claims. (Cl. 143—133)

This invention relates to circular saws.

The users of circular saws have long been beset by many difficulties for which a satisfactory solution has never been proposed heretofore. Some of these difficulties are for example, failure of the saws to run true and cut a straight line, excessive heating, and cracking, particularly at the tooth roots and around the mandrel collars.

In order to overcome these difficulties, saw users have been in the habit of hammering the saws to create tension in certain specific parts thereof, but up to the present time this method has failed to substantially improve the situation, and has in my belief aggravated it in many cases.

Consequently an object of my invention is to provide a new and superior saw.

Another object is to provide a circular saw which will run true.

Another object is to provide a cool running circular saw.

Still another object is to provide a circular saw which will not crack.

To accomplish these objects, I also propose to hammer or otherwise expand the metal of certain portions of the saws, but the portions which I expand are different from those which have been expanded under the old method and it is this difference wherein my invention lies.

I have found that my novel saws do run true and cool and that they do not crack, and that, if they are cracked before being remade in accordance with my invention, the cracks generally do not enlarge thereafter.

Another beneficial advantage of my novel saws is that they will cut efficiently when quite dull and consequently do not have to be sharpened so frequently.

Great stress has always been laid on such details of saw construction and care as sharpening, tooth form, swaging or setting and many others, in the belief that the above enumerated difficulties would be overcome; and, in saws as made prior to my invention, all of these things played important parts in determining the efficiency of a saw. However, when a saw is made in accordance with my invention, I have found that only moderate care and skill need be exercised in regard to these details and that variations therein do not materially affect the efficiency of the saws.

More specific information concerning my novel saws, and other objects and desirable particular constructions will be found upon reading the following detailed description with reference to the accompanying drawings but it is not my intention to be limited to such description or otherwise than by the scope of the claims.

In the drawings

In the following pages I will describe in order with reference to the drawings the following: I. The general equipment used in hammering saws; II. The general methods employed in hammering saws; III. The general method used in testing saws preparatory to, and after hammering in order to determine either the necessity for or the result of hammering them; IV. The old method of hammering saws; V. The response to testing required by the old method; VI. My method of hammering to produce my novel saws; VII. The response to testing given by my novel saws; VIII. The theories which I believe render my novel saws so much superior to and more effective than the old style saws; and IX. The several advantages resulting from my product.

Figure 1:
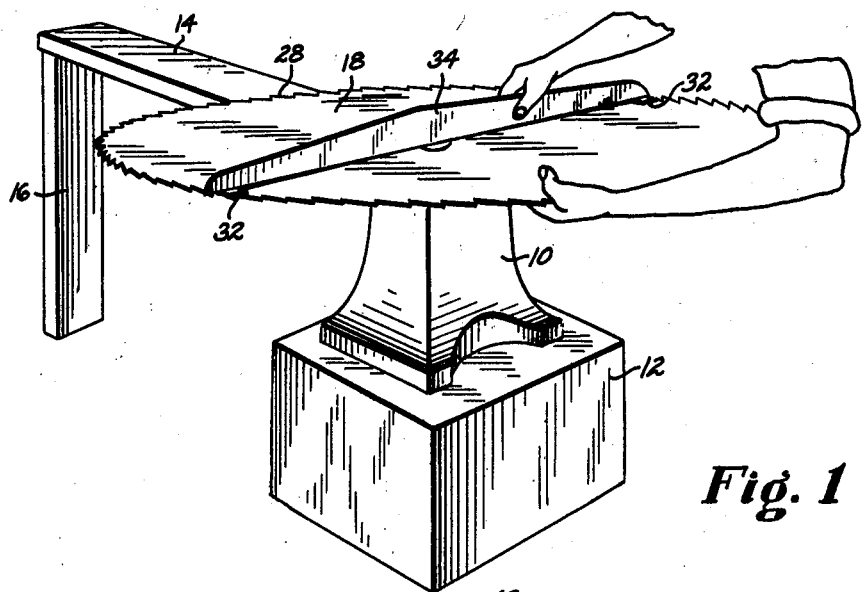
Figure 1 is a perspective view of saw hammering apparatus with a saw being tested

I. Figure 1 illustrates the general equipment used in hammering saws with the single exception of the hammer which should be round or square faced and of medium weight. This equipment comprises an anvil 10 which is either square or rectangular and which is mounted on a base 12 of any suitable material. For convenience in handling the saws, particularly large ones, an anvil board 14 is provided, of which one end is secured to one side of the anvil so that the upper face of the board is flush with or slightly lower than the face of the anvil. The board 14 extends from the anvil on the same level as the anvil face a distance commensurate with the size of the saws to be handled and is supported at its outer end by a standard 16.

II. In hammering, a saw is laid on the anvil board with the spot to be hammered positioned on the face of the anvil. The general practice is to lay out both sides of a saw such as 18 in Figure 2 with concentric circles such as 20 and 22 which are then evenly spaced off by radial lines such as 24. The intersections of these lines and circles are then struck with the hammer, all on one side being struck first and then, the saw having been turned over, those on the other side are struck. The positions of the blows on one side of the saw 18 are indicated by the marks 26. If test indicates that the tension varies in certain sectors of the saw, the force of blows may be lightened or increased in such sectors or they may not be hammered at all.

III. To test a saw in order to determine that the hammering has produced the desired condition of internal stresses it is supported at one edge on the anvil board at 28 (Figure 1) and the artisan grasps the opposite edge with one hand and employs a straight-edge 34 in the other hand to test the saw. The straight-edge 34 should preferably be of a length equal to the diameter of the saw. The straight-edge 34 is laid diametrically across the saw at right angles to the first mentioned diameter as illustrated in Figure 1. The results of the test are indicated by the curvature of the saw on the diameter adjacent the straight-edge as will be more fully described in sections V and VII below.

The saw is turned with reference to the anvil and is tested several times with the saw supported on several more or less equally spaced diameters and on both sides in corresponding positions, and the straightedge is laid across the saw each time. The curvature of the surface of the saw underlying the straightedge must be substantially indentical each time.

Figure 3:
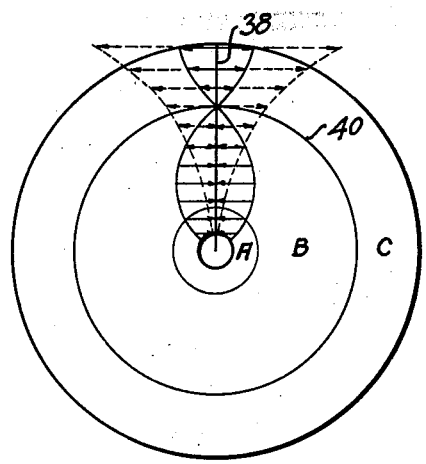
Figures 3 and 4 are diagrammatic illustrations of circular saws illustrating certain theories which I entertain relative to the old type saws.

IV. Referring to Figure 3 the zone A is the zone engaged by the mandrel collars and this zone is seldom hammered except when dished or bent, as the surface must be smooth so that the saw may be held tightly and straight. Just outside of the zone A is a zone B. The old method of treating saws was to hammer in this zone according to the general method previously outlined in II. This hammering creates internal stresses in the saw by expanding the metal generally circumferentially in zone B. A saw in this condition is said to be "tensioned." It seems probable that the internal fibre stresses in the saw in this condition comprise compression in zone B and tension in zone C with an unstressed annulus or neutral zone at the adjacent margins of the two zones B and C. The outer zone C was according to the old method hammered to relieve the tension if too much tension was found to exist but was never hammered for any other purpose.

V. If a saw was properly "tensioned" under the old method when the saw is tested as explained in III, the surface of the saw underlying the straight edge was supposed to be concave, that is, the center of the saw was supposed to drop away from the straight-edge so that it was supported at each end by the periphery of the saw. If when tested the center lifted up, raising the ends of the straight-edge away from the periphery of the saw, it was considered improperly tensioned and in need of treatment.

It is to be understood the center of the saw was supposed to drop away from the straight-edge each time it was tested on each of the several diameters and on both sides; and that the saw is not dished or bent but is truly flat, as can be clearly seen by testing with the straightedge when the saw is mounted on the mandrel or otherwise suitably supported at its center. In other words the test and the saws response to the test is governed by the internal stresses and not by the external shape of the saw, and it is to these internal stresses and the response of a saw to test when properly stressed in accordance with my invention that my invention is related, and not to any special external shape or form of the saw.

Figure 2:
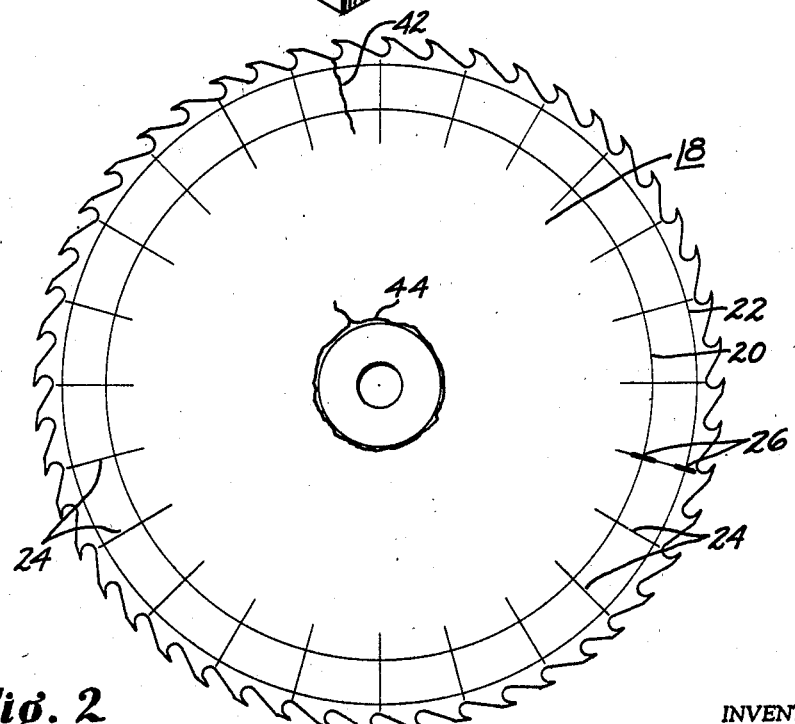
Figure 2 is a plan view of a circular saw illustrating certain points relative to my invention
Figure 4:
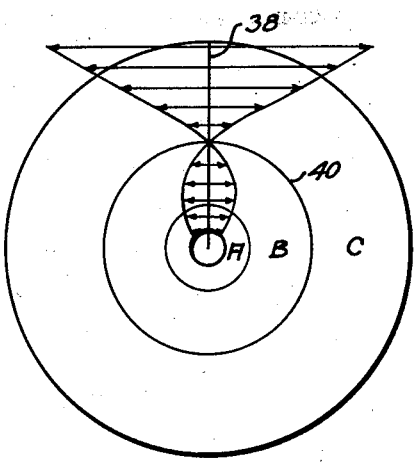
Figure 5:
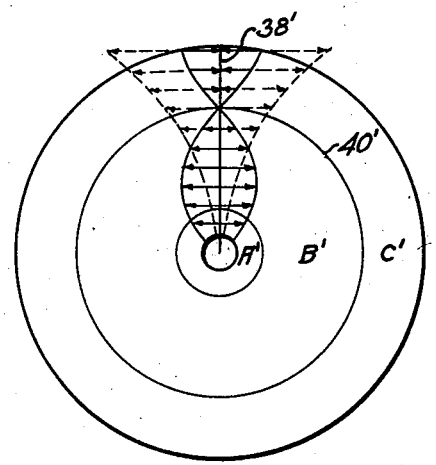
Figures 5 and 6 are diagrammatic views of circular saws illustrating certain theories which I entertain relative to my novel saw.
Figure 6:
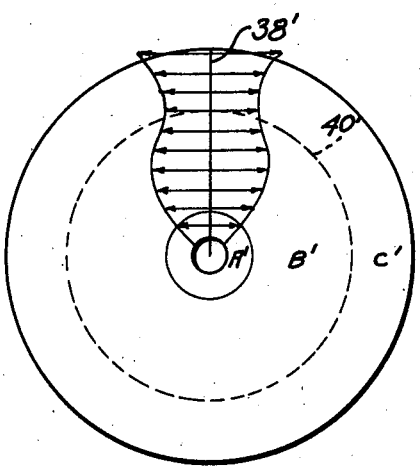

VI. Referring now to Figures 5 and 6, the zones A', B' and C' correspond to the zones A, B and C shown in Figures 3 and 4. According to my novel method I hammer the zone C' to create the desired internal stresses in the saw. If the hammering in this zone is overdone with the result that the test indicates that too great stresses have been created, the section B' may be hammered to relieve them somewhat. In Figure 2 the lines 24 and the circles 20 and 22 are shown to illustrate how the saw may be laid out preparatory to hammering. Starting at the intersection of one of the lines 24 with the circle 22 I hammer each intersection on the respective line with all the circles (if there be more than two) and then progress to the next line either clockwise or counterclockwise until I have gone completely around the saw. The saw is then inverted and the other face is hammered in the same sequence. However, I do not desire to be limited to any particular hammering sequence as I do not find it affects the result obtained to any material extent as long as the metal is evenly expanded.

On larger saws it is usually desirable to lay out three or more circles, corresponding to the circles 20 and 22. Very small saws may require hammering on only one circle. I often find it desirable to hammer on an outer circle positioned as close as possible to the roots of the teeth, but the exact places to be hammered may be varied according to the desires of the artisan or the needs of the moment. If saws are being re-hammered I prefer to lay them out so that new portions of the surface are struck during the hammering process.

This process of hammering tends to expand the metal in the zone C circumferentially and probably creates an internal compressive stress in this zone because the expansion is prevented by the unhammered metal in zone $b$. In order to resist the expansion of the metal in zone C the metal in zone B must acquire an internal tensile stress.

When new saws are heat treated and ready for the hammerer's bench, and when saws are returned for re-treatment after being used, they are not in a uniform condition as to the internal stresses. An experienced worker can detect the variation by the variations in the response of saws to test on the several diameters, and it is within his skill to vary the strength of blows or to omit striking blows in certain places in order to obtain the desired internal stresses so that the saw will respond uniformly to test on all diameters and both sides. For example, if portions of zone C had been accidentally expanded too far it might even be necessary to hammer in zone B in order to expand this zone and relieve the excessive stress of the zone C. All this is within the well known art of the saw hammerer, and these variations of treatment consequently preclude defining the invention in any way except by the response of the treated saw to the test as set forth below.

Figure 8:
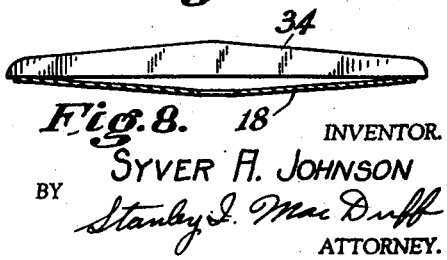

Figure 8 is a diagrammatic representation of an old style saw conditioned according to the old methods. It shows the straightedge 34 placed across the saw 18 and illustrates in an exaggerated manner how the center of the saw drops away from the straightedge.

VII. In testing my novel saw I prefer to use a pair of gauge blocks 32. Thees gauge blocks may be small rectangles of 20 gauge steel, or gauge blocks of other desired material and thickness may be employed if desired. I place these blocks under the ends of the straight-edge 34 adjacent the periphery of the saw. Then with the saw supported between the anvil board and the hand, the center of the saw should raise until it touches the center of the straight-edge. In other words, the diametrical portion of the saw underlying the straight-edge becomes convex or bowed upwardly. The saw must do this on every diameter on both sides, and the response to the test is not a result of the saw being dished or bent but is an index of the internal stresses which have been established by the hammering. The truth of this statement is proved by the fact that a properly treated saw is always flat when mounted on the mandrel or otherwise supported at its eye. Further it is not a result of any unusual external shape of the saw such as a tapering in thickness from the eye to the periphery.

Figure 7:
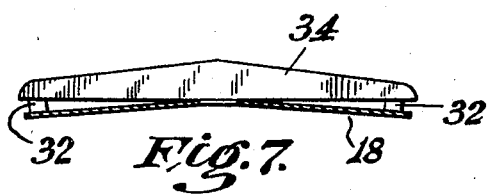
Figs. 7 and 8 are sections through a saw with a straightedge in place showing the response to test of my novel saw and an old style saw respectively.

Figure 7 illustrates diagrammatically the response of my novel saw to the test. It shows the straightedge 34 extending across a saw 18 and resting on the gauge blocks 32 (of exaggered thickness for the purposes of illustration), and it shows how the eye of the saw raises to touch the center of the straightedge.

It will be noted that this test is exactly opposite to that considered desirable under the old method. If the center of the saw does not come up to the straight-edge, the saw may be rehammered in the same way to increase the internal stresses to the desired amount. If it raises farther than the thickness of the gauge blocks it may be desirable to hammer the saw in zone B' with round face hammer to slightly relieve the internal stresses. I do not, however, desire to be limited to the use of the gauge blocks, as a trained eye may easily be substituted therefor, nor do I desire to be limited to the use of gauge blocks of 20 gauge thickness as other thicknesses might be suitable for certain conditions.

VIII. In Figures 3 and 4, in conjunction with the radius 38 I have diagrammatically illustrated the stresses which apparently are created in the saw when hammered by the old method. Those occurring in the zones A and B are compression and those appearing in the zone C are tension stresses resulting from the fact that the metal in zone B has been stretched. The circle 40 is what I would call a neutral circle inasmuch as it would appear that no stress exists in the metal adjacent thereto.

Overlying the indications of stress on Figure 3 are shown in dotted lines the stresses which I believe are created by centrifugal force when the saw is operated at high speed. In Figure 4 I have added these stresses to illustrate the total stress existing in the saw after being tensioned by the old method and when in operation. It will be noted that there is still a neutral circle although it is moved closer to the center of the saw. At the same time the tensile stress adjacent the periphery of the saw has become extremely large in comparison to any other stresses existing therein.

Figure 5 illustrates the stresses which I believe are created in my novel saw. The stresses in the zones A' and B' are tension while those in the zone C' are compression. In dotted lines I have illustrated the same centrifugally created stresses as shown in Figure 3, and in Figure 6 I have added the stresses to show the resultant stresses occurring when the saw has been treated according to my novel method and is in operation. Comparatively evenly distributed tensile stresses exist throughout the saw and there is no neutral circle.

Obviously, if my thories are correct the reduction of tensile stresses in the periphery of the saw would eliminate tendency of the saw to crack in the tooth roots as illustrated in Figure 2 at 42. At the same time these evenly distributed tensile stresses which I believe exist should reduce the tendency of the saw to bow outwardly in spots so as to rub against the material being sawed and thus become heated by friction thereby causing blue spots to appear on the surface of the saw. Furthermore the absence of a neutral circle should make the saw stiffer. It is my belief that flexing of the saw material at this neutral circle is the main cause of collar cracks such as illustrated on Figure 2 at 44.

IX. The main advantages provided by my saw are the elimination of heating and cracks. Another important advantage is the fact that the saw runs true and cuts in a straight line. Still another advantage resides in the fact that less care need be exercised in the conditioning of the saw teeth and I have also found that it is much easier to test a saw for bumps and twists when it is conditioned by my novel method.

Under the old method it was necessary to put the material of the saw under a strain by supporting it at the extremes of a diameter in the same way as in testing to determine if the saw has been properly hammered. When the saw was so strained a short straight-edge was run over the surface adjacent the point 28, and the failure of the straight-edge to contact with the surface at all points indicated the presence of a bump or twist. When a saw is conditioned by my novel method it may be laid flat on the anvil with its center near the center of the anvil, then the short straight-edge is laid upon the saw and the saw is slowly rotated about its center. Under these conditions the saw can be tested over its surface in a few seconds without the necessity of lifting the saw several times as required by the old method.

While my invention has been described with reference to certain specific examples it is not my intention to be limited to those examples or otherwise than by the scope of the claims.

What I claim is:

1. A circular metal saw having radially extending teeth and a centrally disposed eye wherein a circumferential zone of the metal surrounding the eye is stressed in tension, and the remainder of the metal of the saw between said zone and the radially extending teeth is stressed in compression.

2. A metallic circular saw having radially extending teeth and a centrally disposed eye, the metal of the saw in two concentric zones being oppositely stressed, the metal of the outer zone being stressed in compression and extending approximately one third of the radial distance from the teeth to the eye of the saw, and the metal of the inner zone being stressed in tension.

SYVER A. JOHNSON.